United States Patent Office.

ARCHIBALD A. RIDDICK, OF FRANKLIN, VIRGINIA.

Letters Patent No. 110,288, dated December 20, 1870.

IMPROVEMENT IN LINIMENTS FOR THE CURE OF RHEUMATISM.

The Schedule referred to in these Letters Patent and making part of the same.

*To all whom it may concern:*

Be it known that I, ARCHIBALD A. RIDDICK, of Franklin, in the county of Southampton and State of Virginia, have invented a new and useful Improvement in Rheumatic Liniment; and I do hereby declare that the following is a full, clear, and exact description thereof, which will enable others skilled in the art to make and use the same.

My invention has for its object to furnish an improved liniment for the cure of rheumatism in all its forms, pains, sprains, bruises, neuralgia, paralysis, mumps, diptheria, sore throat, corns, bunions, &c., and which will give instant relief in all cases; and It consists in the liniment formed of the ingredients in the proportions and manner hereinafter more fully described.

This liniment is composed of the following ingredients, used in the following proportions, to wit:

Spirits of sulphuric ether, sixteen ounces.
Oil of olive, thirty-two ounces.
Aqua ammonia, sixteen ounces.
Spirits of turpentine, sixteen ounces.
Tincture of arnica, four ounces.
Barbadoes tar, two and one-half ounces.

In preparing the liniment, the turpentine and the tar are mixed together, with which is mixed successively the oil, ether, arnica, and ammonia. The composition when thoroughly mixed together is ready for bottling or use.

Having thus described my invention,

I claim as new and desire to secure by Letters Patent—

The liniment prepared of the ingredients in the proportions and manner substantially as herein set forth and described.

ARCHIBALD A. RIDDICK.

Witnesses:
A. N. NORFLEET,
LUTHER R. EDWARDS.